May 18, 1954 E. W. PAPPENFUS ET AL 2,678,966

SYNCHRONIZING MECHANISM

Filed Feb. 4, 1952

INVENTOR.
ROBERT L. CRAIGLOW
ERNEST W. PAPPENFUS
BY
Marm Moody
ATTORNEY

Patented May 18, 1954

2,678,966

UNITED STATES PATENT OFFICE 2,678,966

SYNCHRONIZING MECHANISM

Ernest W. Pappenfus and Robert L. Craiglow, Cedar Rapids, Iowa, assignors to Collins Radio Company, Cedar Rapids, Iowa, a corporation of Iowa Application February 4, 1952, Serial No. 269,732

6 Claims. (Cl. 178—69.5)

Figure 1:
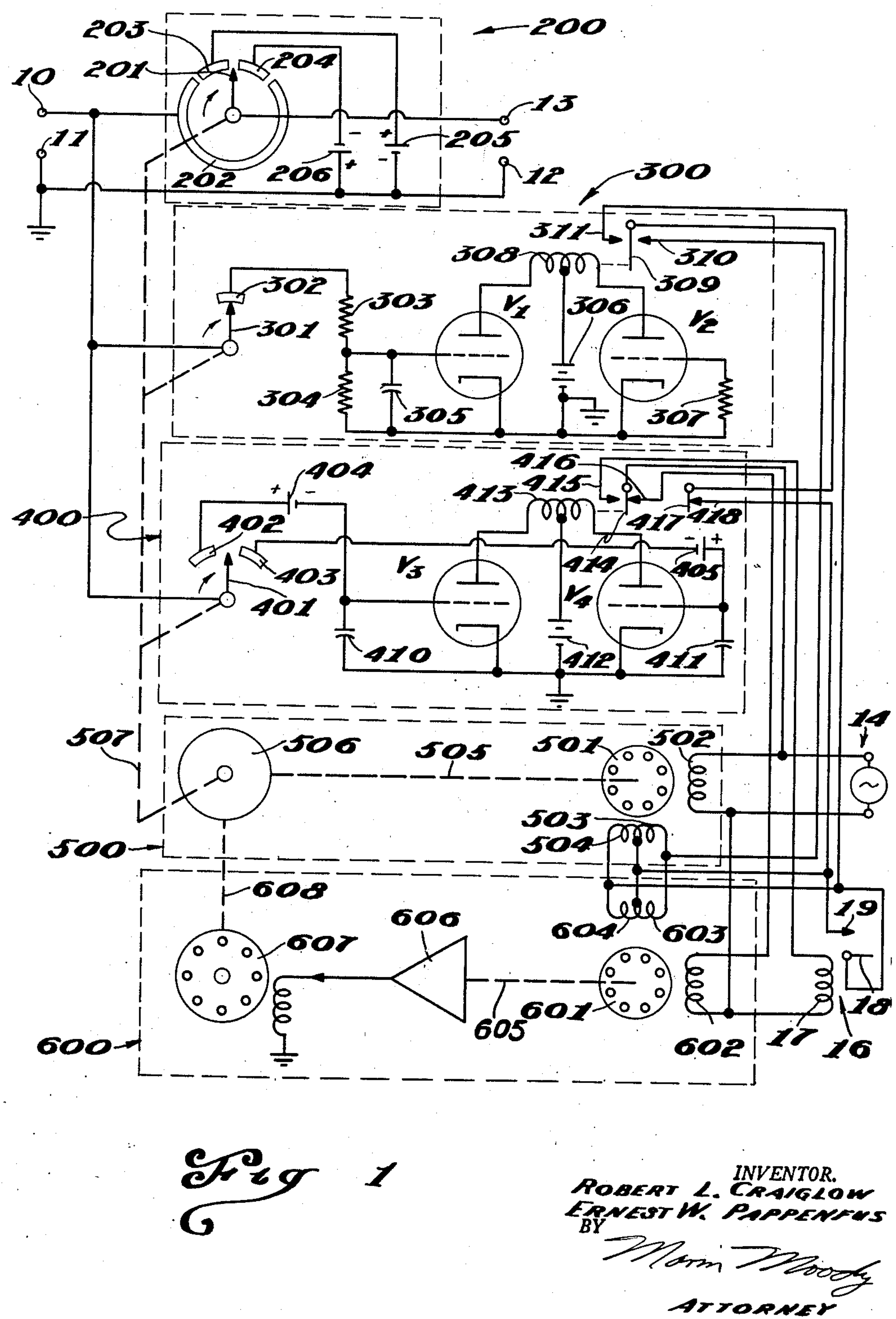

This invention relates in general to a synchronizing circuit, and in particular, to a coarse and fine phase and frequency synchronizing system, for the receiving terminal of an automatic code communication system.

Automatic code communication systems, such as teletypes, have a specific code group for each letter of the alphabet or for each symbol to be transmitted. The code group consists of a current or voltage varying in time in a specific manner relating to the particular symbol being transmitted. In order to be able to separate the individual code groups from one another, it has become customary to precede each code group with a start pulse and to succeed each code group with a stop pulse. The start and stop pulses are, in general, of different character, such as currents of opposite polarity. Such automatic code communication systems utilize flying brushes at the transmitting terminal to initiate the start and stop pulses and at the receiving terminal to separate the start and stop pulses from the code group. In order for the flying brush at the receiving terminal to separate the start and stop pulses from the code group and to separate the code element from the code group, it must run in very close synchronization with the flying brush at the transmitting terminal. Such systems are well known to those skilled in the art and for a more detailed description, reference may be made to pages 109 through 118 of Principles of Electricity Applied to Telephone and Telegraph Work, 1938 edition, American Telephone and Telegraph Company.

It is an object of this invention, therefore, to provide an automatic synchronization system which will synchronize the receiving terminal flying brush with the transmitting terminal flying brush and, after a sufficient synchronizing time, to provide an artificial start and stop pulse in those cases where those transmitted were altered by some type of interference such as noise.

Further objects, features and advantages of this invention will become apparent from the following description and the claims when read in view of the drawing, in which;

The figure is a schematic view of this invention.

For explanation purposes, let it be assumed that the start and stop pulses, whatever their original voltage or current, are converted to negative and positive pulses respectively; these pulses being of equal magnitude and of opposite polarity.

The figure illustrates a pair of terminals 10 and 11 which are connected to the incoming signal, a synthetic start-stop pulse generator, designated generally as 200, output terminals 12 and 13, a fine synchronization detector 300, a coarse synchronization detector 400, a phase corrector 500, a frequency corrector 600, an alternating current power source 14, and a timer motor 16.

The input signal terminal 10 is connected to segment 202 of the start-stop pulse generator, to flying brush 301 of the fine synchronization detector, and to flying brush 401 of the coarse synchronization detector. Input signal terminal 11 is connected to ground. The received code signals, after having been converted so that the stop and start pulses are of equal magnitude but of opposite polarity with the start pulse negative, are connected to terminals 10 and 11.

*The synthetic start-stop pulse generator 200*

The signal input terminal 10 is connected to the code wheel segment 202. Segment 203 is connected to the positive terminal of battery 205 and segment 204 is connected to the negative terminal of battery 206. The other terminal of batteries 205 and 206 are connected to ground. The flying brush 201 is driven by a shaft 507 and is connected to terminal 13 of the signal output terminals.

After synchronism has been obtained between the transmitting and receiving flying brushes as will be described latter, the flying brush 201 will be in contact with segment 204 when the start pulse is being transmitted. Likewise the flying brush 201 will be in contact with segment 203 when the stop pulse is being transmitted. During the remainder of the time the flying brush 201 will be in contact with segment 202 and connects the input terminal 10 to the output terminal 13, thus transferring the input signal code group directly to the output terminal. When the flying brush 201 is on segment 203, a synthetic stop pulse is generated by battery 205 and applied to terminal 13. When the flying brush 201 is on segment 204 a synthetic start pulse is generated by battery 206 and applied to terminal 13. Thus at the output terminals 12 and 13 the original code group applied to terminals 10 and 11 are obtained plus a synthetic start and stop pulse. Should interference cause the start or stop pulse to be modified, the synthetic start and stop pulse generator will supply these pulses at the correct time.

The signal output terminal 12 is connected to ground. Terminals 12 and 13 would normally be connected to a decoding device such as a teletypewriter.

*Fine synchronizing detector 300*

The flying brush 301 is driven by shaft 507 and is connected to input terminal 10. The short segment 302 is connected through resistor 303 to the grid of tube V–1. Resistor 304 and capacitor 305 are connected from grid to cathode of tube V–1. The cathode of tube V–1 connected to ground and the plate is connected through half a polar relay winding 308 to the positive terminal of battery 306. The negative terminal of this battery is connected to ground. The cathode of a balancing tube V–2 is connected to ground while the grid is connected to cathode through resistor 307.

The plate of tube V–2 is connected through half the polar relay winding 308 to the positive terminal of battery 306. When the currents through the two halves of the polar relay winding 308 are equal, the armature 309 will rest midway between the two contacts. An unbalance of current through the two halves of the polar relay winding 308 will cause the armature to make contact with 310 or 311 depending on the direction of the unbalance. Armature 309 is connected through armature 417 and contact 418 to the common terminal of shaded pole windings 503, 504, 603 and 604. Contact 310 is connected to one end of windings 503 and 603 and contact 311 is connected to one end of windings 504 and 604.

After approximate synchronism has been obtained between flying brush 301 and the transmitter flying brush, flying brush 301 will be in contact with segment 302 during the transition between the stop and start pulses of the incoming signal. Under conditions of perfect synchronism the segment 302 will be subjected to plus and minus voltages for equal lengths of time and after brush 301 has broken contact with segment 302, there will be no residual charge left on capacitor 305 and thus, the grid potential on tube V–1 will be zero. Since the potential on the grid of tube V–2 is also zero, the armature 309 will rest between the two contacts 310 and 311. Should the synchronization be such that the negative start pulse or the positive stop pulse persist longer on segment 302, capacitor 305 would be left with a negative or positive residual charge, respectively. This would cause an unbalance in the current drawn by tubes V–1 and V–2 and, therefore, deflect the armature 309 to contact 310 or 311. This will cause motor armatures 501 and 601 to run in such a direction as to correct the synchronization error as will be described later.

*Coarse synchronizing detector 400*

Flying brush 401 is driven by shaft 507 and is connected to the signal input terminal 10. Segment 402 is connected through battery 404 to the grid of tube V–3. Capacitor 410 connects the grid of tube V–3 to ground. The cathode of tube V–3 is connected to ground while the plate is connected through one half of a neutral relay winding 413 to the positive terminal of a battery 412.

Segment 403 is similarly connected to tube V–4 except that the positive terminal of battery 404 is connected to segment 402 while the negative terminal of battery 405 is connected to segment 403. Relay armatures 414 and 417 are shown in the non-energized position. Should any unbalance of the currents in tubes V–3 and V–4 exist regardless of the direction of unbalance, armature 414 will break contact with 416 and make contact with 415, while armature 417 will break contact with 418.

When approximate synchronization has been obtained, the negative start pulse will be received during the entire time that flying brush 401 is in contact with segment 403. Since battery 405 is equal and opposite to the start pulse potential, no current will charge capacitor 411 and the residual charge on this capacitor will be zero. Similar reasoning will show that when the positive stop pulse is received during the entire time that flying brush 401 is in contact with segment 402, the residual charge on capacitor 410 will be zero.

Since, under the aforementioned conditions, the potentials on the grid of tubes V–3 and V–4 are zero, the current through the two tubes will be equal and the relay winding 413 will not be energized and alternating current will be supplied to the field winding 602 through armature 414 and contact 416. Also relay armature 417 will be in contact with 418 thus connecting armature 309 to one side of the motors' shaded pole windings 503, 504, 603 and 604, and the fine synchronizing detector 300 will control the rotation of motor armature 501 and 601.

Should a gross error in synchronism occur so that a positive voltage is not received during the entire time the flying brush 401 is in contact with segment 402 and/or a negative voltage is not received during the entire time the flying brush 401 is in contact with segment 403, relay winding 413 will be energized due to an unbalance of the currents in tubes V–3 and V–4. This will break the contact between armature 417 and contact 418, thus disabling the control of armature 309 on the shaded pole windings 503, 504, 603 and 604. Also armature 414 will disengage with contact 416 and engage contact 415 thus de-energizing field 602 and energizing the timer motor field 17.

*Frequency corrector 600*

The frequency corrector consists of a frequency standard 606 that may be a crystal, whose output drives a synchronous motor 607. The shaft 608 of this motor drives a differential gear 506. The frequency of the frequency standard can be varied slightly by rotating shaft 605 which might be connected to a trimmer capacitor that would produce this change. Shaft 605 is driven by motor armature 601 with its associated field winding 602 and shaded pole windings 603 and 604. When the fine synchronizing detector is in operation the field winding 602 is energized from the alternating current source 14 and the direction of rotation of armature 601 will depend on which of the two shaded pole windings is shorted by armature 309. If neither is shorted, the armature 601 will be stationary. Thus, any difference in the frequency of the transmitter and receiver flying brush will eventually result in a phase error of sufficient magnitude to cause the fine synchronizing detector to operate motor armature 601 in the direction necessary to correct this frequency error.

*Alternating current power source 14*

The alternating current power source 14 would normally be supplied from a 110 volt 60 cycle power line. It is represented here in the interest of completeness as a generator. This power source supplies the timing motor 16, the phase corrector motor 501 and the frequency corrector motor 601.

*Timer motor 16*

The timer motor winding 17 is energized by relay armature 414 when a gross error in synchronization is apparent. This motor moves contact arm 18 toward contact 19. After a specified interval of time has elapsed, arm 18 will contact 19 thus shorting shaded pole winding 504 and causing motor armature 501 to increase the speed of shaft 507 by means of the differential gear 506. Because the shaft is now operating well above synchronous speed, the receiving flying brushes will eventually reach phase synchronism with the transmitter flying brush which will immediately cause the course synchronizing detector to de-energize winding 17 and open contacts 18 and 19. At this time the fine synchronizing detector will resume control.

*Phase corrector 500*

The phase corrector motor winding 502 is always connected to the alternating current power source 14. The direction of rotation will depend on whether shaded pole winding 503 or 504 is shorted. If neither is shorted, the armature 501 will not rotate. Shaft 505 mechanically connects the armature 501 with the remaining input shaft of the differential gear 506. Thus, the angular velocity of shaft 507 can be either accelerated or retarded with respect to shaft 608. This provides a fast means of correcting any phase error between the transmitting and receiving flying brushes while the frequency of the frequency standard 606 is being synchronized with the transmitting terminal equipment.

*Résumé*

To illustrate more clearly the functions performed by this device, let us assume that a radio teletype communication system provides a polar teletype signal at the receiving terminal equipment which is connected to the signal input terminals 10 and 11 and that the output terminals 12 and 13 are connected to a teletypewriter. In estaplishing the initial synchronization, contact arm 18 would be manually closed. This would cause the flying brushes at the receiving terminal to rotate faster than those at the transmitting terminal until the brushes at the receiving terminal came into phase coincidence with the transmitting brush. At this time the coarse synchronizing detector 400 would cause the fine synchronizing detector 300 to take control of the phase and frequency corrector motors and thus maintain synchronization.

After synchronization has been obtained the start and stop pulses would be supplied to the teletypewriter even in the presence of severe noise. This would insure that the proper number of letters would be printed even though noise might cause them to be printed incorrectly. However, the readability would be improved and incorrect letters could be interpolated from the context of the message. Also, without this system, several letters may be missed due to a single noise pulse since it disturbs the synchronization of the teletypewriter. The effect of isolated noise pulses on the synchronizing circuits can be minimized by making the charging time of capacitor 305 very long and also by using a slow acting relay 413. Complete fading for short periods of time will not cause loss in synchronization since the fine synchronizing detector is disabled and the timing motor contacts will not have closed. Complete fading for long periods of time will automatically reinitiate the process described under initial synchronization.

Although this invention has been described with respect to a particular embodiment thereof, it is not to be so limited as changes and modifications may be made therein which are within the full intended scope of the invention as defined by the appended claims.

We claim:

1. A synchronizing mechanism for a teletype receiver comprising, a pair of input terminals receiving the input signal thereon, a synthetic start-stop pulse generator having a code wheel, a first flying brush, three segments mounted about said code wheel with two of said segments being of the same size and both substantially smaller than the three, said first flying brush engageable with said three segments, a first battery connected between one of the input terminals and one of the smaller segments with the positive terminal of the battery connected to the segment, a second battery with the same potential as the first battery connected between the second segment and the same input terminal with the negative terminal of the battery connected to the segment, a pair of output terminals one of which is connected to one of the input terminals and the other connected to the first flying brush, a fine synchronizing detector comprising a fourth segment, a second flying brush, a pair of resistors connected in series between the fourth segment and ground, a condenser in parallel with the grounded resistor, a first balancing tube with its control grid connected to one side of said condenser, a second balancing tube connected in a balanced circuit with said first balancing tube, a polar relay with its actuating winding connected between the first and second balancing tubes, a switch controlled by said polar relay and movable between a pair of contacts, a driving means connected to said first and second flying brushes, a pair of corrector motors connected to said switch, one of said corrector motors connected to add its shaft output to the drive shaft of said driving means, a frequency standard supplying an input to said driving means and the other corrector motor connected to control the output frequency of the frequency standard.

2. Means for synchronizing a receiving terminal with a transmitting terminal comprising, three flying brushes, a drive shaft connected to said three brushes, a differential gear connected to the drive shaft, a drive motor supplying an input to said differential, a frequency standard supplying an input to said drive motor to control its rate of rotation, three segments mounted about the first flying brush and engageable therewith with the first two of said segments substantially smaller than the third segment, a pair of input terminals receiving the incoming signal and one of said terminals connected to the second and third flying brushes and to the third segment, a pair of batteries of equal potential connected in opposite polarity to the other input terminal and the opposite sides of said batteries connected respectfully, to the first and second segments, a pair of output terminals, one output terminal connected to the first flying brush and the other one connected to the second input terminal, a fourth relatively small segment mounted adjacent the second flying brush and engageable therewith, a pair of balancer tubes, a polar relay mounted in the plate circuit of said balancer tubes, a first condenser connected between the grid of one of said balancer tubes and ground, the fourth segment connected to one side of said condenser, a three position switch movable between a pair of contacts and controlled by said polar relay, a phase control motor connected to one of the contacts and engageable with the three position switch and supplying a first input to said differential, a frequency control motor connected to said three position switch and furnishing a shaft output to said frequency standard to adjust its output frequency, a coarse synchronizing circuit comprising fifth and sixth relatively small segments mounted closely adjacent one another and engageable with the third flying brush, a second pair of balancing tubes, a second neutral relay connected in the plate circuits of said balancing tubes, the fifth segment connected to the grid of the third balancing tube through a battery which has the negative side connected to the grid, a sixth segment connected to the grid of the fourth balancing tube through a battery which has the positive side connected to the grid, a second two position switch controlled by said second neutral relay and connected to said phase control and frequency control motors, and a third two position switch controlled by said second relay and in series with the first three position switch so as to disconnect it when the second relay is energized.

3. A synchronizing system for a teletype receiver comprising, a synthetic start and stop pulse generator which receives the incoming signal, a fine synchronizing detector receiving the incoming signal, a coarse synchronizing detector receiving the incoming signal, a frequency standard, a master driving means controlled by said frequency standard, a frequency adjusting motor connected to said frequency standard and receiving inputs from said coarse detector, and a phase correcting motor receiving an input from said synchronizing means and adjusting the phase of the output shaft of said master driving means.

4. A synchronizing system for a teletype receiver comprising, a pair of input terminals receiving the incoming signal thereon, first, second and third flying brushes, the second and third flying brushes connected to one of said input terminals, a drive shaft connected to said first, second and third brushes to drive them in synchronization, a differential connected to said drive shaft, a master driving motor supplying an input to said differential to drive said first, second and third brushes, a frequency standard supplying an input to said master drive motor to control its speed of rotation, a frequency adjusting motor connected to said frequency standard to adjust its frequency, a phase control motor supplying a shaft output to said differential to vary the phase of the master drive shaft, the second flying brush engageable with a small segment at a position corresponding to the change from stop to start pulses, a fine synchronizing control circuit connected to said small segment and to said phase control motors, a pair of small segments mounted adjacent the third flying brush and corresponding to positions, respectively, of the start and stop pulses, and a coarse synchronizing detector receiving inputs from said pair of segments and suplying outputs to said frequency control motor.

5. A synchronizing system for a teletype receiver comprising, a synthetic start and stop generator which receives the incoming signal, a coarse synchronizing detector which receives the incoming signal, a fine synchronizing detector which receives the incoming signal, a frequency standard, a master driving means controlled by said frequency standard and supplying shaft inputs to said fine and coarse synchronizing detectors and the synthetic start and stop pulse generator, a frequency adjusting motor connected to said frequency standard and receiving an input from said coarse detector, and a phase correcting motor receiving an input from said fine synchronizing detector and adjusting the phase of the output shaft of said driving means.

6. Means for synchronizing a teletype receiver with an incoming signal comprising, coarse synchronizing means, fine synchronizing means, a synthetic start and stop pulse generator, the incoming signal supplied to said fine and coarse synchronizing means and the synthetic start and stop pulse generator, a master driving means supplying a shaft input to said fine and coarse synchronizing means and said start and stop pulse generator, a frequency standard supplying a control input to said driving means, the coarse synchronizing detector supplying an input to said frequency standard, and a phase controlling means supplying an input to said master driving means and receiving an input from said fine synchronizing detector.

References Cited in the file of this patent

UNITED STATES PATENTS

| Number | Name | Date |
|---|---|---|
| 2,487,682 | Wendt | Nov. 8, 1949 |
| 2,495,946 | Schuler | Jan. 31, 1950 |
| 2,534,337 | Canfora | Dec. 19, 1950 |